United States Patent
Schnader et al.

[11] Patent Number: 5,253,915
[45] Date of Patent: Oct. 19, 1993

[54] MOTOR VEHICLE FOLDING HOOD

[75] Inventors: Jürgen Schnader, Weil im Schönbuch; Martin Guckel, Wiernsheim; Walter Cornel, Sindelfingen; Helmut Rottler, Aidlingen, all of Fed. Rep. of Germany

[73] Assignee: Mercedes-Benz A.G., Fed. Rep. of Germany

[21] Appl. No.: 920,208

[22] Filed: Jul. 27, 1992

[30] Foreign Application Priority Data

Jul. 26, 1991 [DE] Fed. Rep. of Germany ....... 4124813

[51] Int. Cl.$^5$ ............................................... B60J 1/00
[52] U.S. Cl. ..................... 296/107; 296/108; 296/118
[58] Field of Search .............. 296/107, 108, 109, 114, 296/118

[56] References Cited

U.S. PATENT DOCUMENTS

| | | | |
|---|---|---|---|
| 4,572,570 | 2/1986 | Trucco | 296/107 |
| 4,573,732 | 3/1986 | Muscat | 296/108 |
| 4,695,089 | 9/1987 | Fukutomi et al. | 296/107 |
| 4,964,668 | 10/1990 | Hofmann | 296/107 |

FOREIGN PATENT DOCUMENTS 0189649  8/1986  European Pat. Off. .

*Primary Examiner*—Joseph D. Pape
*Attorney, Agent, or Firm*—Evenson, McKeown, Edwards & Lenahan

[57] ABSTRACT

A folding hood for motor vehicles has a hood frame supporting the hood cover and being fordable to an open position in order to stretch the hood cover, and a reinforcement of the stretched hood cover, adjoining a strut supporting the cover, by way of a shaping shell mounted between the strut and the hood cover. Because of its dimensional rigidity, the cover interacts in a shaping manner with the hood cover resting flat thereon. The shaping shell is positioned under the hood cover via a tensile connecting device extending transversely to the strut and stretched tightly when the hood frame is folded open. In order to permit a space-saving storage position of the folding hood even with a larger-sized shaping shell the shaping shell is transversely deformable, in a flexurally resilient manner, about a longitudinal axis extending along its bearing position on the strut. When the folding hood is open, the shaping is retained in a relaxed initial position. The shaping shell can only be bent into its shaping position of use by way of the tensioning advance of the tensile connecting devices when the folding hood is closed.

13 Claims, 2 Drawing Sheets

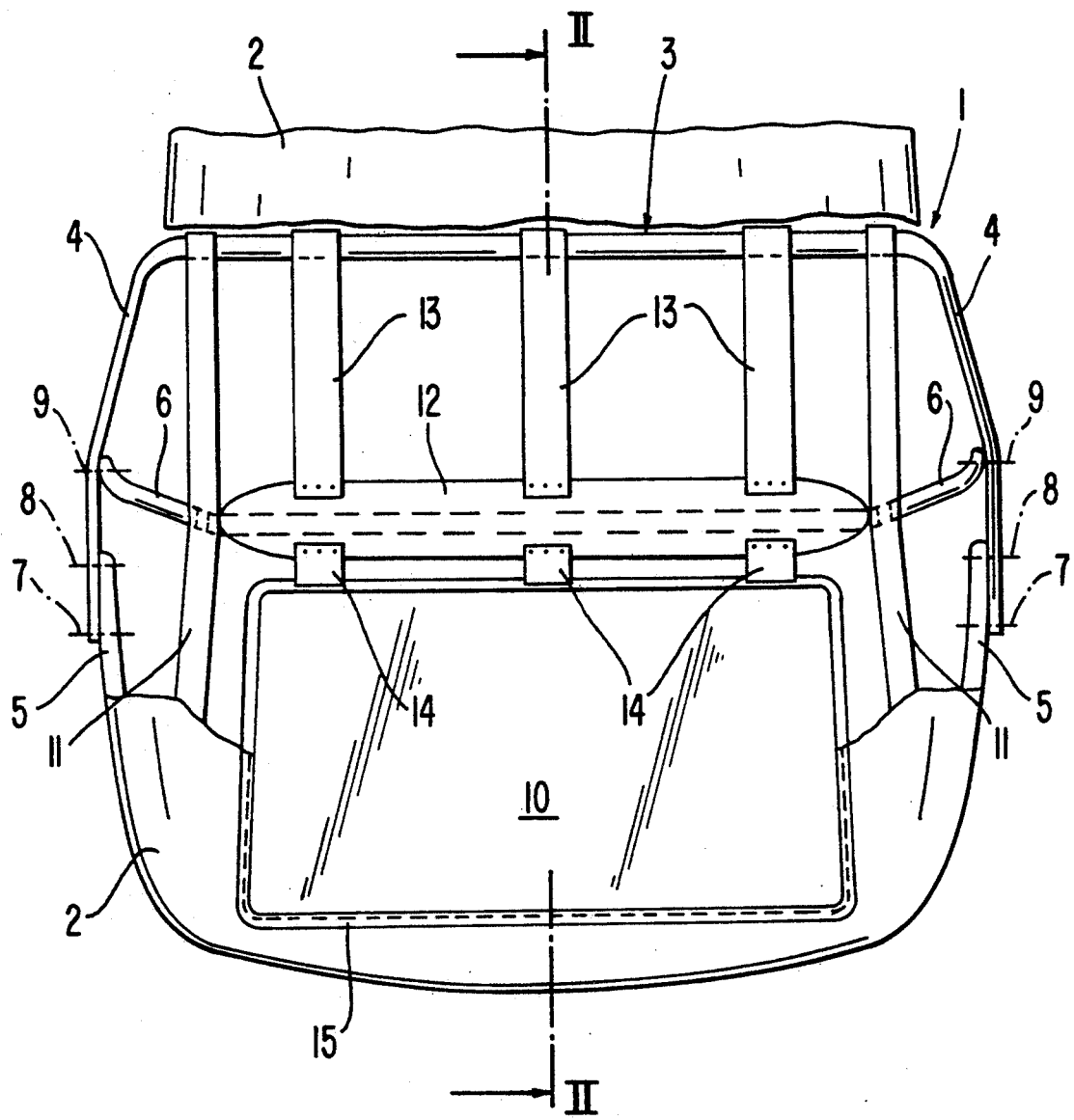

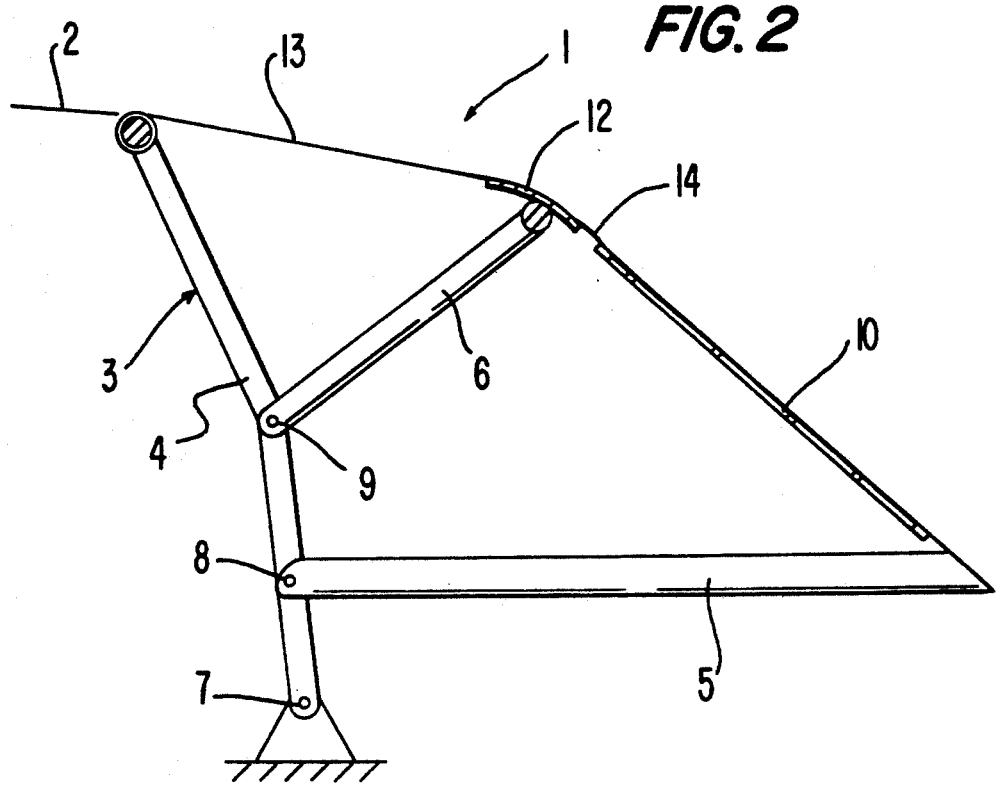
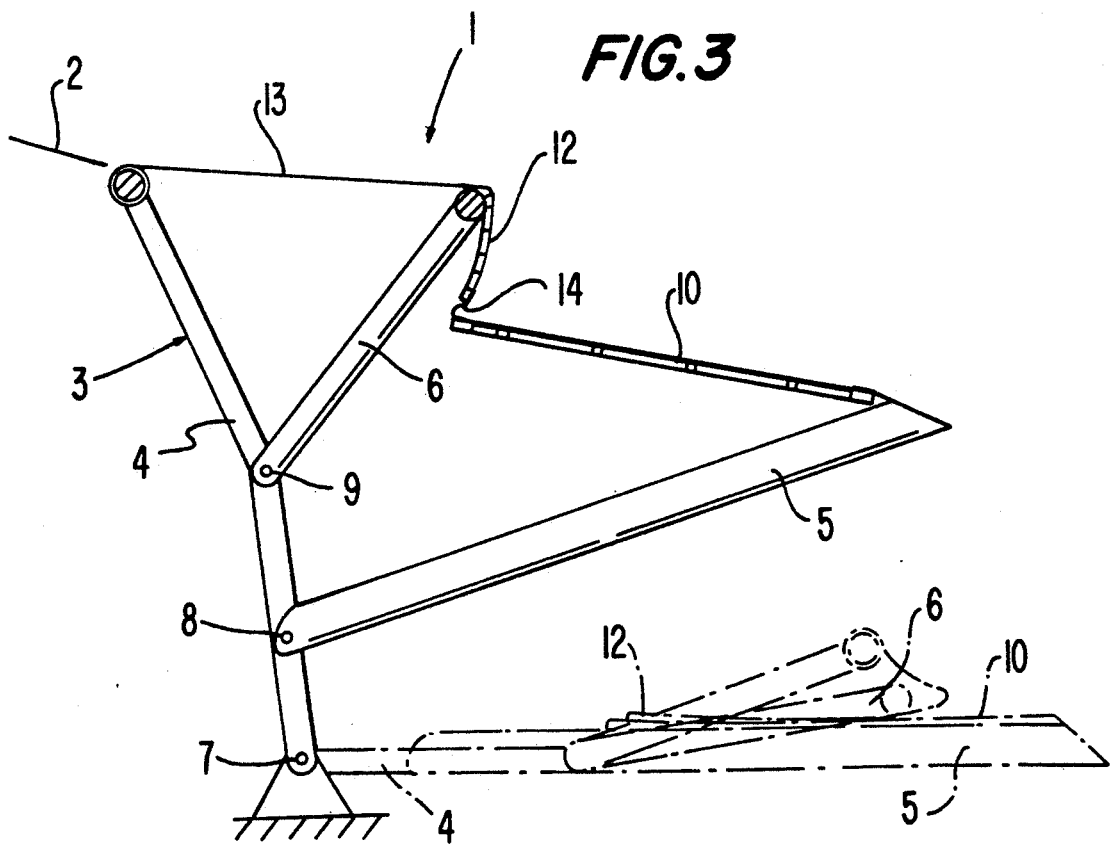

MOTOR VEHICLE FOLDING HOOD

BACKGROUND AND SUMMARY OF THE INVENTION

The present invention relates to a folding hood for motor vehicles, and more particularly, to a hood frame which supports the hood cover and can be folded open in order to stretch the hood cover, and a reinforcement of the stretched hood cover, adjoining a strut supporting the latter, by way of a shaping shell mounted between the strut and the hood cover, which, because of its dimensional rigidity, interacts in a shaping manner with the hood cover resting flat thereon. The shaping shell is positioned under the hood cover via tensile connectors extending transversely to the strut and stretched tightly when the hood frame is folded open.

A folding hood is disclosed, for example, in EP-PS 0 189 649, in which the shaping shell is fixed to the central region of the corner strut and is thus pivotable, together with the corner strut, relative to the hood cover. The surface of the shaping shell which faces the hood cover has a conformation, as seen in cross-section, which is adapted to the intended corner contour of the folding hood. A strap extends on each side of a rear window in the folding hood and is attached by its front end to a main strut and by its rear end to a material-retaining hoop of the folding hood. When the material-retaining hoop and the main strut are folded apart, the two straps are increasingly tightened, together with the hood cover, as a result of which they are stretched substantially straight when the hood is closed. Since the two straps are also connected to the corner strut, the latter is entrained by the extending straps into its end position, with the shaping shell also entering its reinforcing position.

When the vehicle roof is open, the folding hood is retracted into a hood box on the body work. For this purpose, the main strut, the corner strut and the material-retaining hoop are folded one upon the other in a space-saving manner. This space-saving storage position, in which the hood cover and the straps are slackened and lay between the folded-together frame parts, is, however, only readily possible because the shaping shell, seen in cross-section, only has a width which approximately corresponds to twice the cross-sectional width of the corner strut. If, by contrast, the width of the shaping shell were significantly increased in order to provide a shaping reinforcement for a larger surface area of the hood cover, the shaping shell would make a similarly compact storage position impossible because of its transverse extent relative to the plane of the folded-together frame parts.

An object of the present invention is to provide a folding hood of the aforementioned type such that compact folding of the stored folding hood remains possible even with a larger-sized shaping shell for the shaping reinforcement of the hood cover.

This object has been achieved in accordance with the invention by configuring the shape shell to be transversely deformable, in a flexurally resilient manner, about a longitudinal axis extending along its bearing position on the strut. When the folding hood is open, the shell is retained in a relaxed initial position, and when the folding hood is closed, the shaping shell can be bent into its shaping position of use by way of the tensioning advance of the tensile connecting apparatus.

In principle, it is possible here to retain the arrangement of the shaping shell on the supporting strut. To do this, the projecting cross-sectional width of the shaping shell in its relaxed initial position has to extend approximately parallel to the plane outlined by the strut supporting it. In the simplest case, moreover, it is possible for the hood cover itself to form the tensile connecting apparatus. However, this requires a hood material of low extensibility.

Because of the outward angling of the exterior contour in the corner-strut zone of the folding hood, it is expedient in accordance with the present invention to reinforce the V hood cover in a surface area lying in front of and behind the corner strut. A proven way of doing this is a shaping shell which is curved in an arcuate manner and is moved, independently of the corner strut, via tensile connecting apparatus. In its position of use, the shaping shell is more sharply angled outwards than in its relaxed initial position. In this arrangement, it is also readily possible to pivot the corner strut under the shaping shell which still has a low curvature. This is even more the case if the corner strut consists of a metal profile with a round cross-section which interacts with a shaping shell of slip promoting metal or of plastic.

A stable, rocker-type bearing position of the shaping shell on the corner strut can be achieved via tensile apparatus which are stretched forwards and backwards and by way of which the front and back edge zones of the shaping shell are stretched in opposite directions.

The forward stretching is cost-effectively achieved by a plurality of straps leading from the main strut.

The rearward stretching of the shaping shell is performed by a combination of a strip of hood cover, a rigid rear window and short straps. This combination is arranged between the shaping shell and the material-retaining hoop. As a result, structural parts which are in any case present are advantageously utilized as tensioning apparatus.

As a consequence, moreover, of the short, film-hinge-type connection of the rear window to the shaping shell, in combination with the restoring force of the flexurally deformed shaping shell, a permanent tilting support of the rear window is achieved in a simple manner. This tilting support makes it possible to prevent sagging of the rear window which occurs especially in the case of heavy rear windows made from mineral glass because of the fact that the region of the hood cover enclosing the rear window extends excessively.

The film-hinge-type connection can advantageously be made via a plurality of short straps which engage on the shaping shell in a manner which is a mirror image of the front straps. Therefore, it is possible to achieve substantially uniform flexural deformation of the shaping shell over its length.

A masked attachment of the straps to the rear window can be simply achieved via a window frame enclosing the rear window.

A tapering of the two end regions of the shaping shell to the side of the rear window present the function of the shaping shell from being impaired, and there is little impediment to the foldability of the hood cover in the lateral wall region.

BRIEF DESCRIPTION OF THE DRAWINGS

These and further objects, features and advantages of the present invention will become more apparent from the following detailed description with the accompanying drawings where:

FIG. 1 is a plan view of the rear part of a folding hood partially broken away;

FIG. 2 is a vertical sectional view along line II—II in FIG. 1 with the hood in a closed position; and FIG. 3 is a vertical sectional view similar to FIG. 2, but with the hood partly open.

DETAILED DESCRIPTION OF THE DRAWINGS

For reasons of simplification, only a rear section of a folding hood 1 of a convertible car (the car not being shown in its entirety) need be shown for an understanding of the invention by one of ordinary skill. Nor does the drawing show the associated conventional hood box in which the folding hood 1 is stored, in a folded-together state, when the convertible car roof is open.

When the folding hood 1 is closed, as shown in FIGS. 1 and 2, the textile fabric hood cover 2 is stretched over a supporting hood frame which comprises, as rear frame parts, a main strut designated generally by numeral 3 with lateral hood columns 4, a material-retaining hoop 5 which forms the bottom termination of the hood 1, and a corner strut 6 arranged between them. The lower ends of the two hood columns 4 are mounted on the vehicle body in a conventional manner via a main bearing 7, as a result of which the main strut 3 is mounted to be pivotable about a horizontal transverse axis of the vehicle.

At a distance above the main bearing 7, the lateral legs of the generally V-shaped material-retaining hoop 5 are articulated at their front ends, via a hinge 8 on each side, on the hood column 4 assigned thereto, as a result of which the material-retaining hoop 5 is mounted to be pivotable relative to the main strut 3 about a similarly horizontal transverse axis of the vehicle. The material-retaining hoop 5 rests on a hood box lid which is attached to the body work of the convertible car in order to be pivotable counter thereto, and is held down, as shown, in its horizontal bearing position in a known manner by locking it to the hood box lid.

The corner strut 6, which is likewise approximately U-shaped, is also mounted by the front ends of its lateral legs at a distance above the hinges 8 to be pivotable, via axis-parallel hinges 9, on the assigned hood column 4 of the main strut 3, supporting the hood cover 2 in front of a rear window 10 of mineral glass which is integrated into a large-sized window aperture in the hood cover 2. The rear window extends almost to the top edge of the material-retaining hoop 5 and has a rectangular shape as best seen in FIG. 1. The corner strut 6 is held in its desired position by two control straps 11 extending to the sides of the rear window 10. The control straps 11 are each attached at their ends to the main strut 3, on one hand, and to the material-retaining hoop 5, on the other hand. As a result, the straps are tightly stretched in the longitudinal direction of the folding hood 1 parallel to the hood cover 2. In this arrangement, the straps 11 each rest on lateral outward-angled portions of the corner strut 6, whose straight central region makes a transition into the lateral legs adapting to the lateral roof contour, and are connected to these outward-angled regions. When the main strut 3 and the material-retaining hoop 5 are folded apart in order to erect the hood cover 2 as seen in FIG. 2, the corner strut 6 is pivoted, by way of the increasingly tightened control straps 11, into its illustrated designed position, as a result of which the corner strut 6 is automatically positioned relative to the hood cover 2.

In order to reinforce the entire area of the corner contour of the hood cover 2 which is supported by the corner strut 6, a shaping shell 12 is mounted between the straight central region of the corner strut 6 and the hood cover 2 passed over the corner strut 6. The shaping shell consists of an aluminum alloy and is deformable in a flexurally resilient manner. The shaping shell 12 has a narrow rectangular shape and rests on the circumference of the circular strut tube in a substantially linear manner, approximately along its median longitudinal axis, as a result of which it is supported in a rocker-like manner. Seen in cross-section, the shaping shell 12 has the profile of a plane-parallel plate which, in the course of adaptation to the intended corner contour of the hood cover 2, is curved in an arcuate manner. The shaping shell 12 thus rests, in the position of use which arises with the hood 1 closed, with its top side resting flat on the opposing surface area of the hood cover 2. Since the hood cover 2, for its part, is tightly stretched, the shaping shell 12 thus interacts with the hood cover 2 to provide shaping. In its lateral end regions, the shaping shell 12 has a cross-section which tapers in a wedge-shaped manner diverging from the rectangular shape towards its rounded end which extends to the assigned outward-angled portion of the corner strut 6.

In its position of use, the shaping shell 12 is retained in its bearing position and undergoes transverse flexural deformation about its longitudinal axis which extends along its contact with the strut. To accomplish this, the shell 12 is stretched forwards and backwards via tensile connectors in the form of three straps 13 extending parallel to the median longitudinal axis of the hood 1 serving as front tensile connecting apparatus and, like the control straps 11, consisting of flexible material with low longitudinal extensibility. One of the straps 13 is arranged centrally and the other straps are stretched at a distance laterally thereof. The front ends of the straps 13 are connected to the central strut tube of the main strut 3, to which end the strut tube is surrounded at this point by loop-shaped end regions of the straps 13. At the rear end, the straps 13 are riveted to the shaping shell 12 in a front edge zone thereof.

Opposite to the rivet attachment points of the straps 13, three additional, very short straps 14 are riveted to the rear edge zone of the shaping shell 12, connecting the shaping shell 12 at the rear, in the manner of a film hinge, to an upper frame section of a window frame 15 which encloses the rear window 10 on the peripheral side. As a result, the hood cover 2 is also mounted on the peripheral side. In order to fix the rear strap ends to the window frame 15, conventional detachable fixing devices such as screws or the like (not shown) are provided. Along its lower edge side, the rear window 10 is likewise articulated in the manner of a film hinge to the central region of the material-retaining hoop 5 because of the connection between the lower frame section of the window frame 15 and the material-retaining hoop 5 lying immediately below the frame 15. Apart from the flexible connector which act as film hinges, and the window frame 15 to which the connectors are attached in a masked manner to form a masked pivot stop, the oblique rear window 10 thus forms the rear tensioning device for the shaping shell 12.

During opening of the folding hood 1, front hood closures connecting a front roof section of the hood 1 to a frame section of the windscreen (not shown) of the convertible car are actually released, and the roof section is then pivoted upwards. Consequently, the longitudinal tensile forces in the hood covering 2 are relaxed. This first phase of opening, however, has no effect as yet on the shaping shell 12.

The material-retaining hoop 5 is then unlocked and pivoted upwards about the hinges 8, relative to the erect main strut 3, in order that the hood box lid beneath it can be opened, the previously stretched straps 13 and 14 slackening at this time. With the cessation of the tensioning forces, the flexurally deformed shaping shell 12 instantaneously springs back into a relaxed initial position in which its cross-section has a significantly greater radius of curvature. A flattening of the shell profile thus takes place. At the same time, the rear window 10 tilts downward, as a result of its weight, about its rear hinge axis onto the upward-moving material-retaining hoop 5. The entrained shaping shell 12 is tilted backwards about its longitudinal axis and slides transversely downward on the profile of the corner strut 6, and the corner strut 6 is pivoted about its hinges 9 to bring it closer to the main strut 3 as seen in FIG. 3. During a continued folding advance of the rear window 10, the shaping shell 12 slips down from the tube of the corner strut 6 and moves, relative to the corner strut 6 towards hinges 9. The straps 13 instead of the shaping shell 12 now rest on and surround the central tube of the corner strut 6. As soon as the material-retaining hoop 5 has been pivoted sufficiently high, the hood box lid can be lifted up backwards, past the latter, as a result of which the hood box aperture is exposed.

Subsequently, the folding hood 1 can be pivoted into the hood box, about the main axis 7, by folding the main strut 3 backwards and downwards through an angle of approximately 90°. In the storage position of the hood 1 which has thus been reached (shown by dot-dash), the rear window 10 rests on the material-retaining hoop 5. In that position the corner strut 6 is pivoted virtually into the plane outlined by the main strut 3 and extends above the rear window 10 rested on the material-retaining hoop 5, and the shaping shell 12 for its part, is rested backwards on the rear window 10 therebelow, as a result of which it is housed in a space-saving manner.

When the folding hood 1 is closed, a substantially similar but reversed sequence of movements takes place, so that detailed explanations can be dispensed with. As a result of the superimposition of the movement control of the corner strut 6 via the control straps 11, and of the shaping shell 12 via the tensile connector, the shaping shell 12 automatically slides back onto the corner strut 6 and is bent into its position of use.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A folding hood for a motor vehicle, comprising a hood cover, a hood frame including a strut for supporting the hood cover and configured to be foldable closed in order to stretch the hood cover, and a shaping shell for reinforcing the stretched hood cover and adjoining the strut, said shaping shell being mounted between the strut and the hood cover and being provided with a dimensional rigidity to interact in a shaping manner with the hood cover resting flat thereon, the shaping shell being positioned under the hood cover via tensile connectors extending transversely to the strut, said tensile connectors being stretched tightly when the hood frame is folded closed, wherein said shaping shell is configured to be transversely deformable, in an elastically resilient manner, about a longitudinal axis extending along a bearing position thereof on the strut such that, when the folding hood is open, said shaping shell is retained in a relaxed initial position having a defined initial shape, and, when the folding hood is closed, said shaping shell can be bent into the shaping manner of use by tensioning advance of said tensile connectors.

2. The folding hood according to claim 1, wherein the strut is a corner strut configured to pivot relative to said shaping shell which has an arcuate curvature, as viewed in cross-section, and a radius of curvature thereof being adapted, in a position of use, to a predetermined corner contour of the folding hood.

3. The folding hood according to claim 2, wherein said shaping shell, in the position of use, bears in a rocker-like manner on the corner strut and is configured to be flexurally deformed by the tensile connectors comprising forward-stretched tensile connectors engaging on a front edge zone of said shaping shell, and backward-stretched tensile connectors engaging on a rear edge zone of said shaping shell.

4. The folding hood according to claim 3, wherein the forward-stretched tensile connectors constitute a plurality of straps connected to the front edge zone of said shaping shell such that said shaping shell is connected to a main strut of the folding hood.

5. The folding hood according to claim 3, wherein an upper edge side of a dimensionally rigid rear window, is connected to the rear edge zone of the shaping shell so as to be pivotable, a lower edge side of the rear window being connected to a supporting profile for retaining the hood cover so as to be pivotable, whereby the rear window forms the largest portion of the backward-stretched tensile connectors.

6. The folding hood according to claim 5, wherein a plurality of short straps are distributed over the width of the rear window to stop pivoting of the rear window at said shaping shell.

7. The folding hood according to claim 4, wherein the straps connected to the front edge zone of said shaping shell are arranged flush with the short straps.

8. The folding hood according to claim 5, wherein the straps connected to the front edge zone of said shaping shell are arranged flush with the short straps.

9. The folding hood according to claim 8, wherein a plurality of short straps are distributed over the width of the rear window to stop pivoting of the rear window at said shaping shell.

10. The folding hood according to claim 5, wherein the lower edge side of the rear window is connected, via the hood cover, in a film hinge manner and is retained by the supporting profile.

11. The folding hood according to claim 5, wherein the rear window is enclosed by a window frame configured as a masked pivot stop.

12. The folding hood according to claim 2, wherein said shaping shell ends at lateral outward-angled portions of the corner strut, with two end regions of said shaping shell, viewed in cross-section, being tapered.

13. A folding hood for a motor vehicle, comprising a hood cover, a hood frame including a strut for supporting the hood cover and configured to be foldable closed in order to stretch the hood cover, and a shaping shell for reinforcing the stretched hood cover and adjoining the strut, said shaping shell being mounted between the strut and the hood cover and being provided with a dimensional rigidity to interact in a shaping manner with the hood cover resting flat thereof, the shaping shell being positioned under the hood cover via tensile connectors extending transversely to the strut, said tensile connectors being stretched tightly when the hood frame is folded closed, wherein said shaping shell is configured to be transversely deformable, in an elastically resilient manner, about a longitudinal axis extending along a bearing position thereof on the strut such that, when the folding hood is open, said shaping shell is retained in a relaxed initial position having a defined initial shape, and, when the folding hood is closed, said shaping shell can be bent into the shaping manner of use by tensioning advance of said tensile connectors, wherein the strut is a corner strut configured to pivot relative in said shaping shell which has an arcuate curvature, as viewed in cross-section, and a radius of curvature thereof being adapted, in a position of use, to a predetermined corner contour of the folding hood, wherein said shaping shell, in the position of use, bears in a rocker-like manner on the corner strut and is configured to be flexurally deformed by the tensile connectors comprising forward-stretched tensile connectors engaging on a front edge zone of said shaping shell, and backward-stretched tensile connectors engaging on a rear edge zone of said shaping shell.

* * * * *